No. 660,237. Patented Oct. 23, 1900.
G. H. ZIEGLER.
TYPE CASTING MACHINE.
(Application filed Jan. 18, 1896.)
(No Model.) 8 Sheets—Sheet 1.

Witnesses:
F. D. Goodwin
Will. A. Baw

Inventor:
George H. Ziegler
by his Attorneys
Howson & Howson

No. 660,237. Patented Oct. 23, 1900.
G. H. ZIEGLER.
TYPE CASTING MACHINE.
(Application filed Jan. 18, 1896.)

(No Model.) 8 Sheets—Sheet 3.

No. 660,237. Patented Oct. 23, 1900.
G. H. ZIEGLER.
TYPE CASTING MACHINE.
(Application filed Jan. 18, 1896.)
(No Model.) 8 Sheets—Sheet 4.
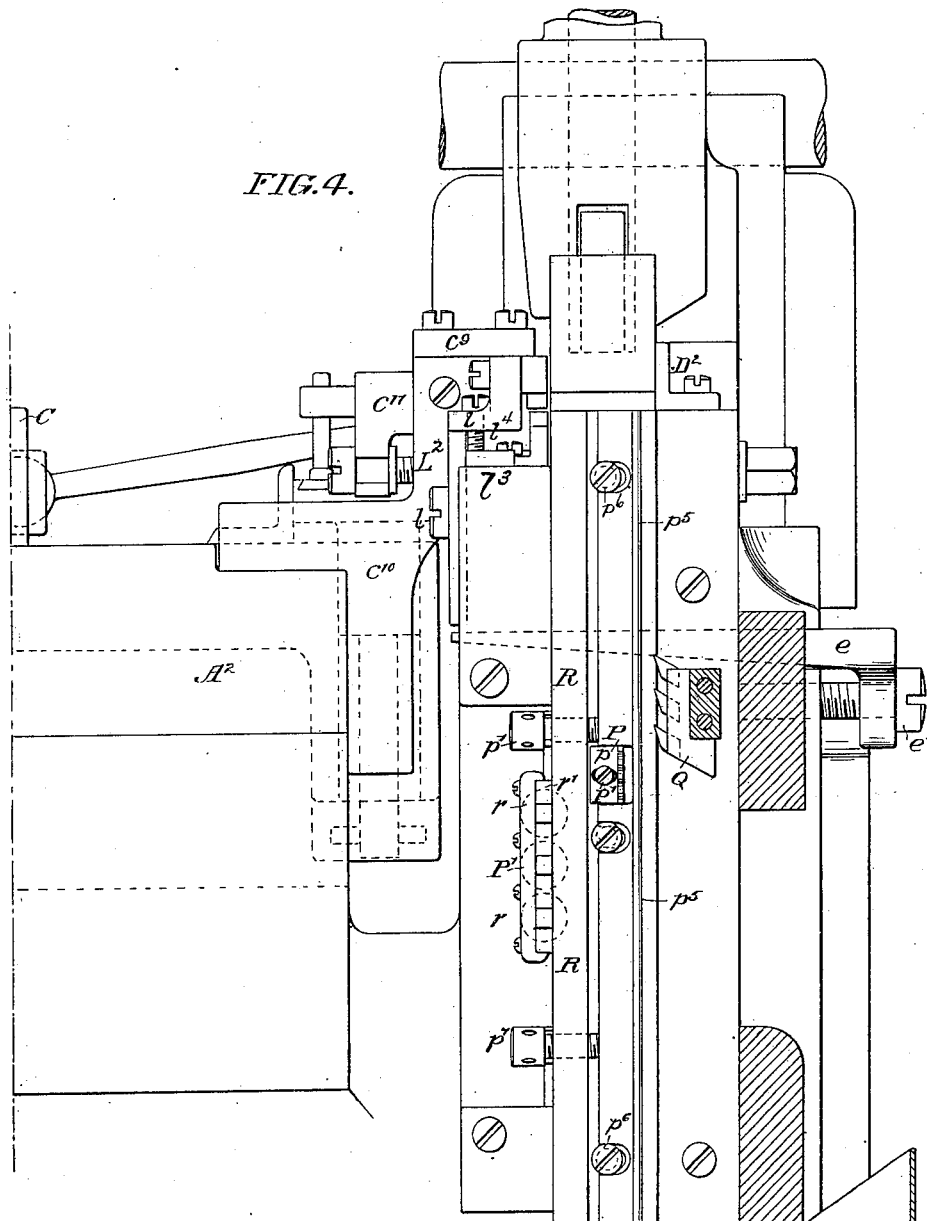
FIG. 4.
FIG. 15.
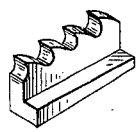
Witnesses:
F. D. Goodwin
Will A. Barr
Inventor
George H. Ziegler
by his Attorneys
Howard & Howson

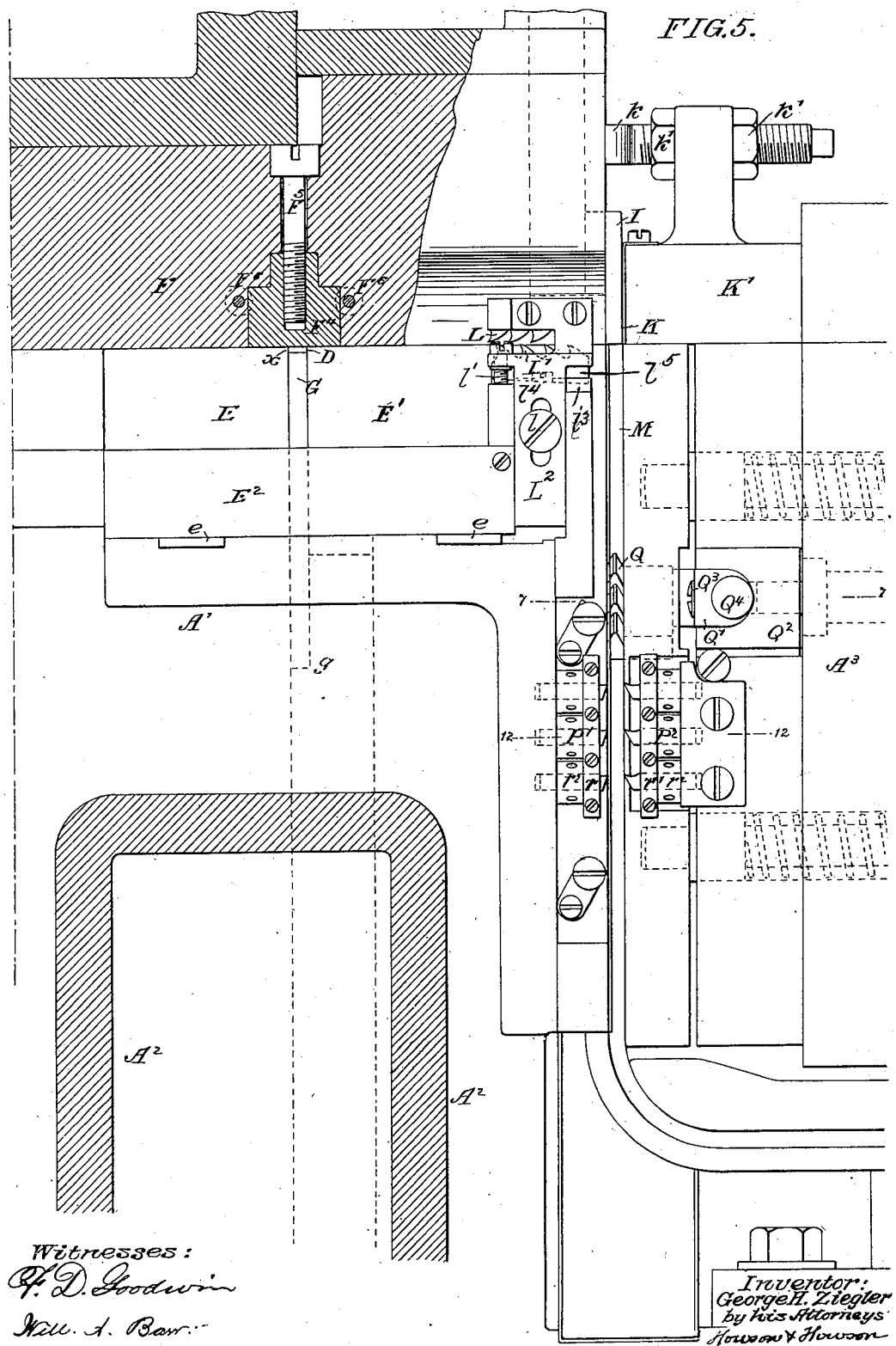

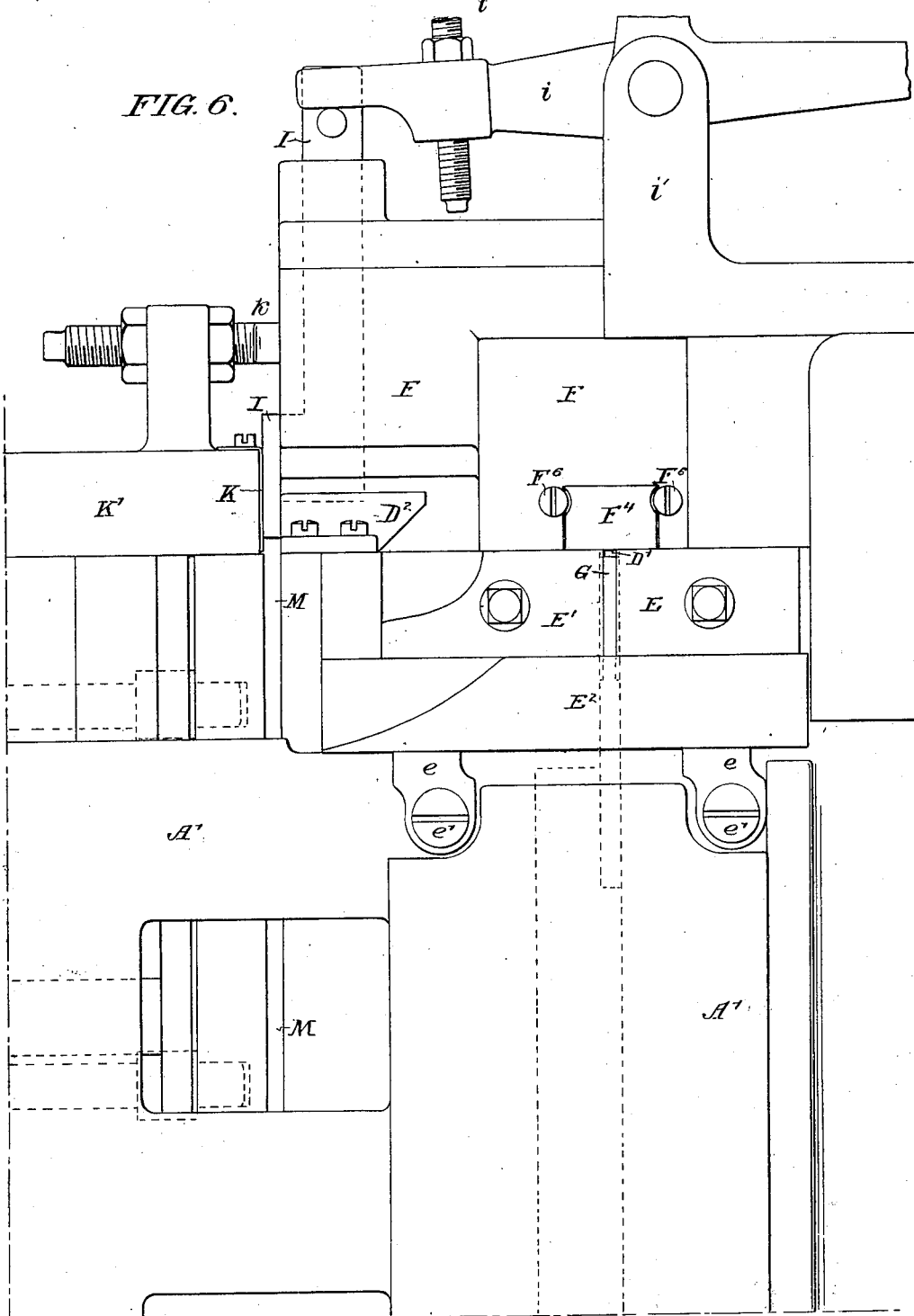

No. 660,237. Patented Oct. 23, 1900.
G. H. ZIEGLER.
TYPE CASTING MACHINE.
(Application filed Jan. 18, 1896.)
(No Model.) 8 Sheets—Sheet 7.
FIG. 8.
FIG. 7.
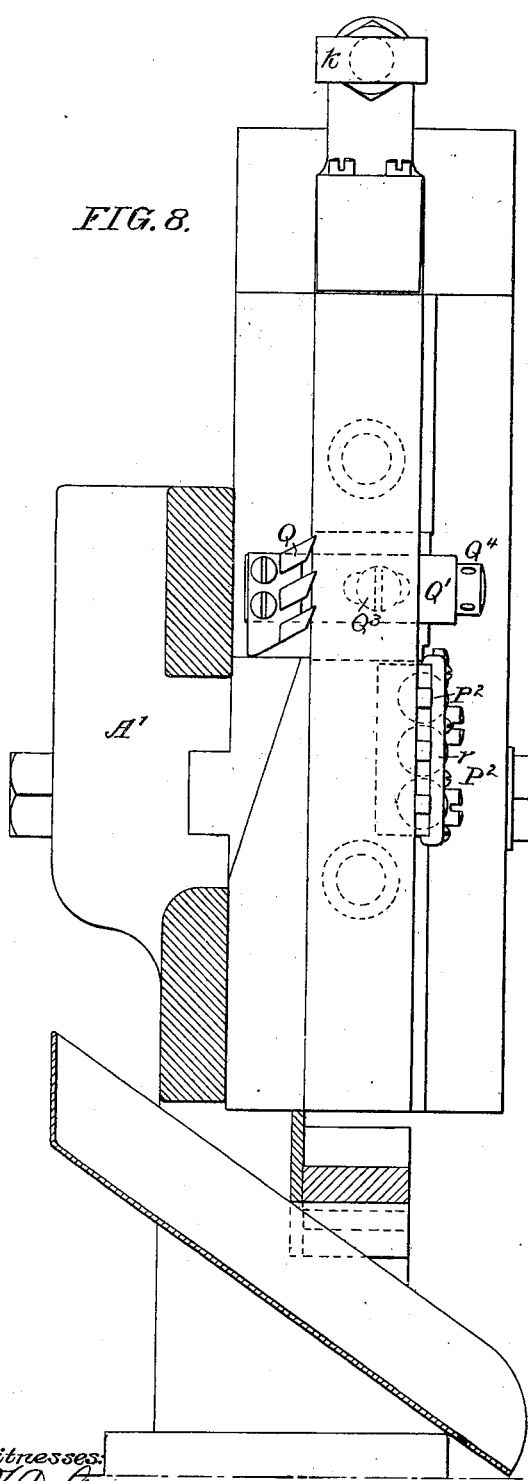
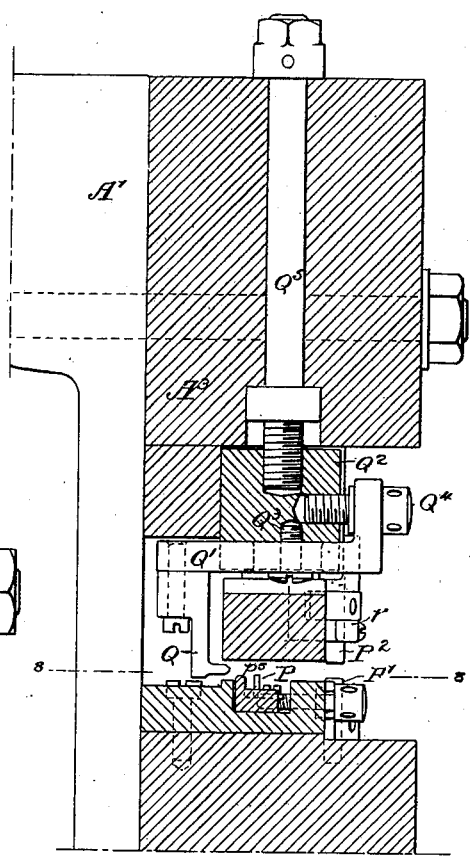
FIG. 16.
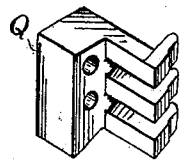
Witnesses:
F. D. Goodwin
Will. A. Barr
Inventor:
George H. Ziegler
by his Attorneys
Howson & Howson No. 660,237. Patented Oct. 23, 1900.
G. H. ZIEGLER.
TYPE CASTING MACHINE.
(Application filed Jan. 18, 1896.)
(No Model.) 8 Sheets—Sheet 8.

Witnesses:
F. D. Goodwin
Wm. A. Barr

Inventor:
George H. Ziegler
by his Attorneys
Howson & Howson

UNITED STATES PATENT OFFICE.

GEORGE H. ZIEGLER, OF PHILADELPHIA, PENNSYLVANIA, ASSIGNOR TO THE AMERICAN TYPE FOUNDERS COMPANY, OF NEWARK, NEW JERSEY.

TYPE-CASTING MACHINE.

SPECIFICATION forming part of Letters Patent No. 660,237, dated October 23, 1900.

Application filed January 18, 1896. Serial No. 576,036. (No model.)

*To all whom it may concern:*

Be it known that I, GEORGE H. ZIEGLER, a citizen of the United States, residing in Philadelphia, Pennsylvania, have invented certain Improvements in Type-Casting Machines, of which the following is a specification.

My invention relates to improvements in type-casting machines for which Letters Patent were granted January 24, 1888, numbered 376,765.

One object of my invention is to provide means for adjusting the mold and the slide which forms the upper part of the mold, a device for holding the matrix whereby it can be readily adjusted or detached, and also a device for regulating the distance between the two slides which carry the type to the channel.

A further object of my invention is to improve the grooving and dressing apparatus, so that the type will be more perfectly finished and stamped with the trade-mark before leaving the machine, reference being had to the accompanying drawings, in which—

Figure 1:
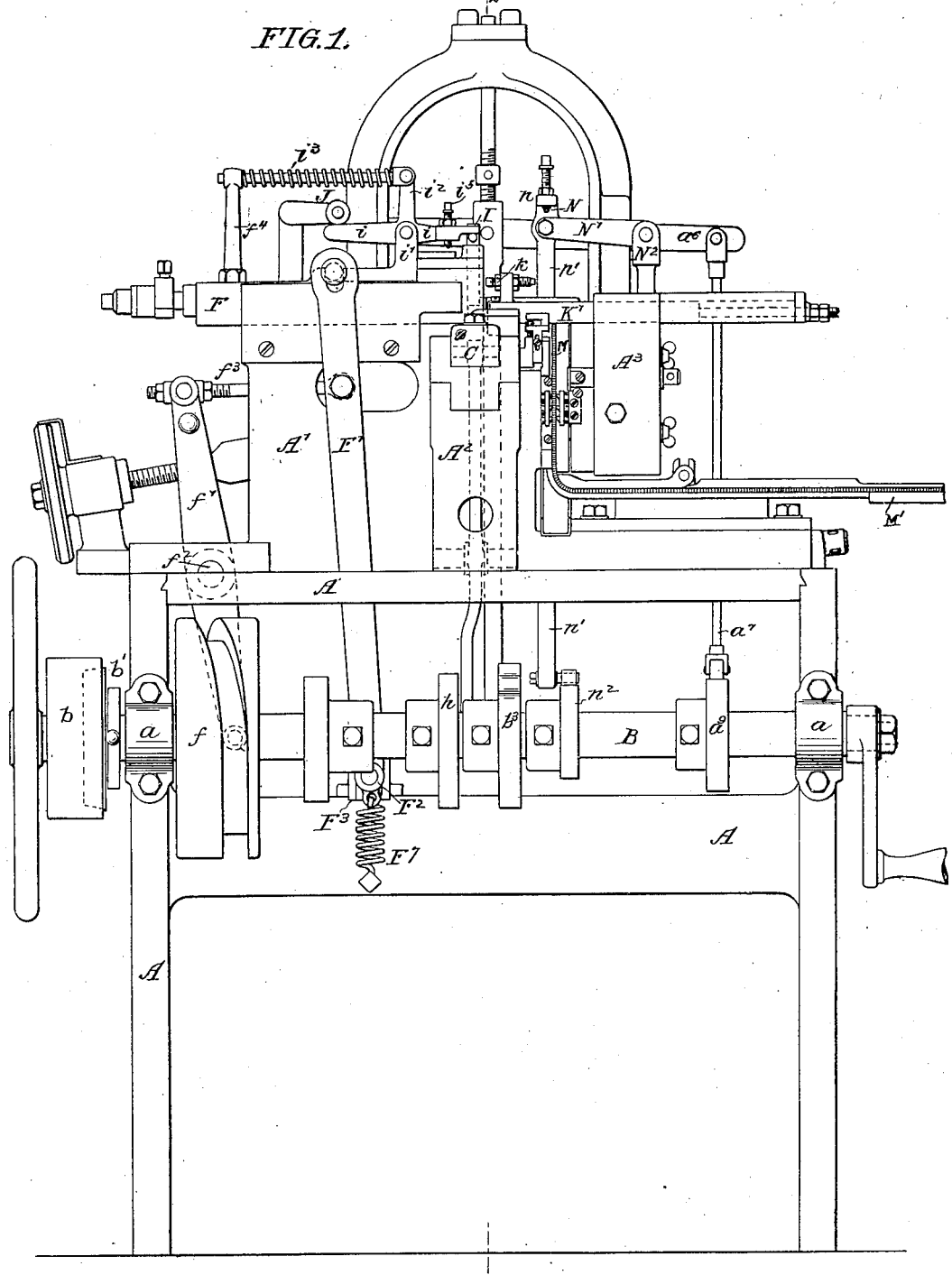
Figure 2:
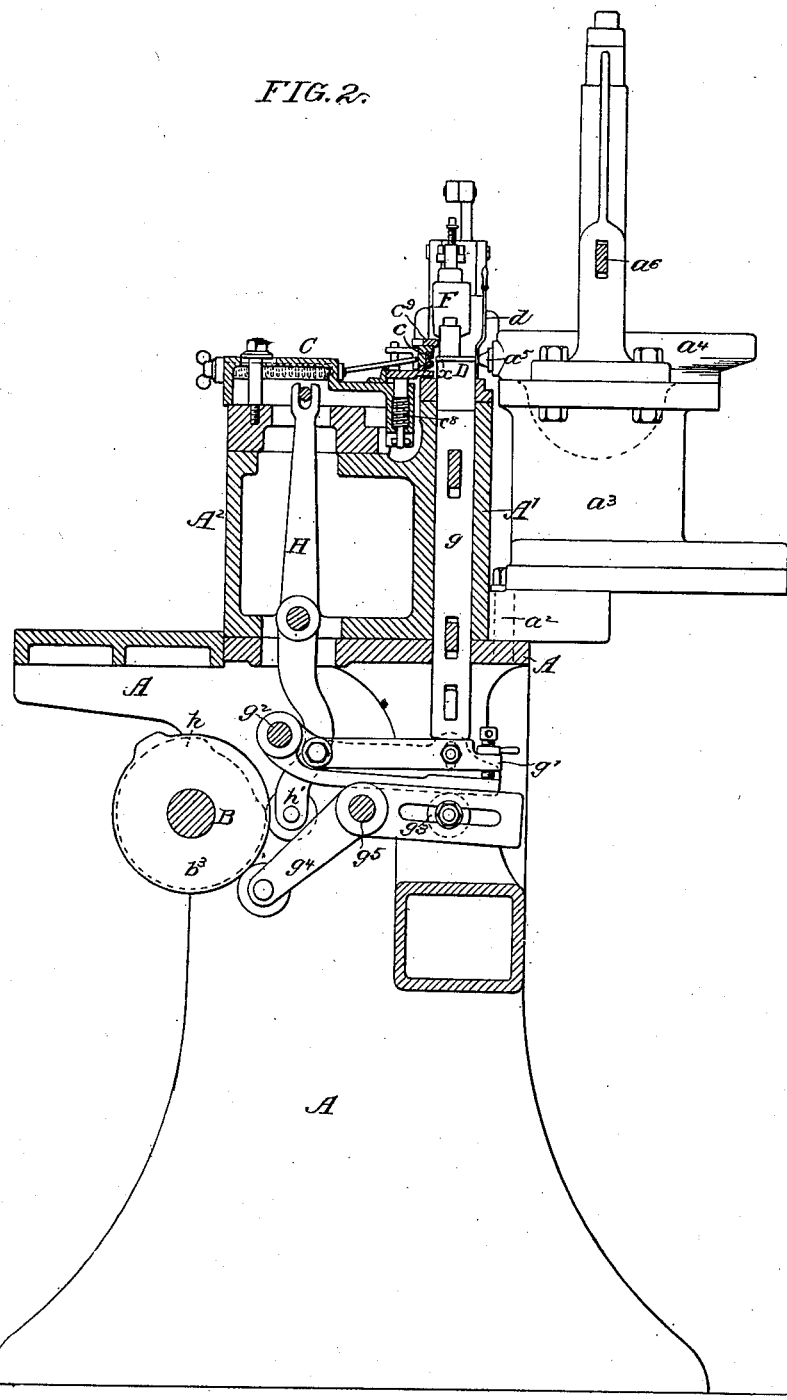
Figure 3:
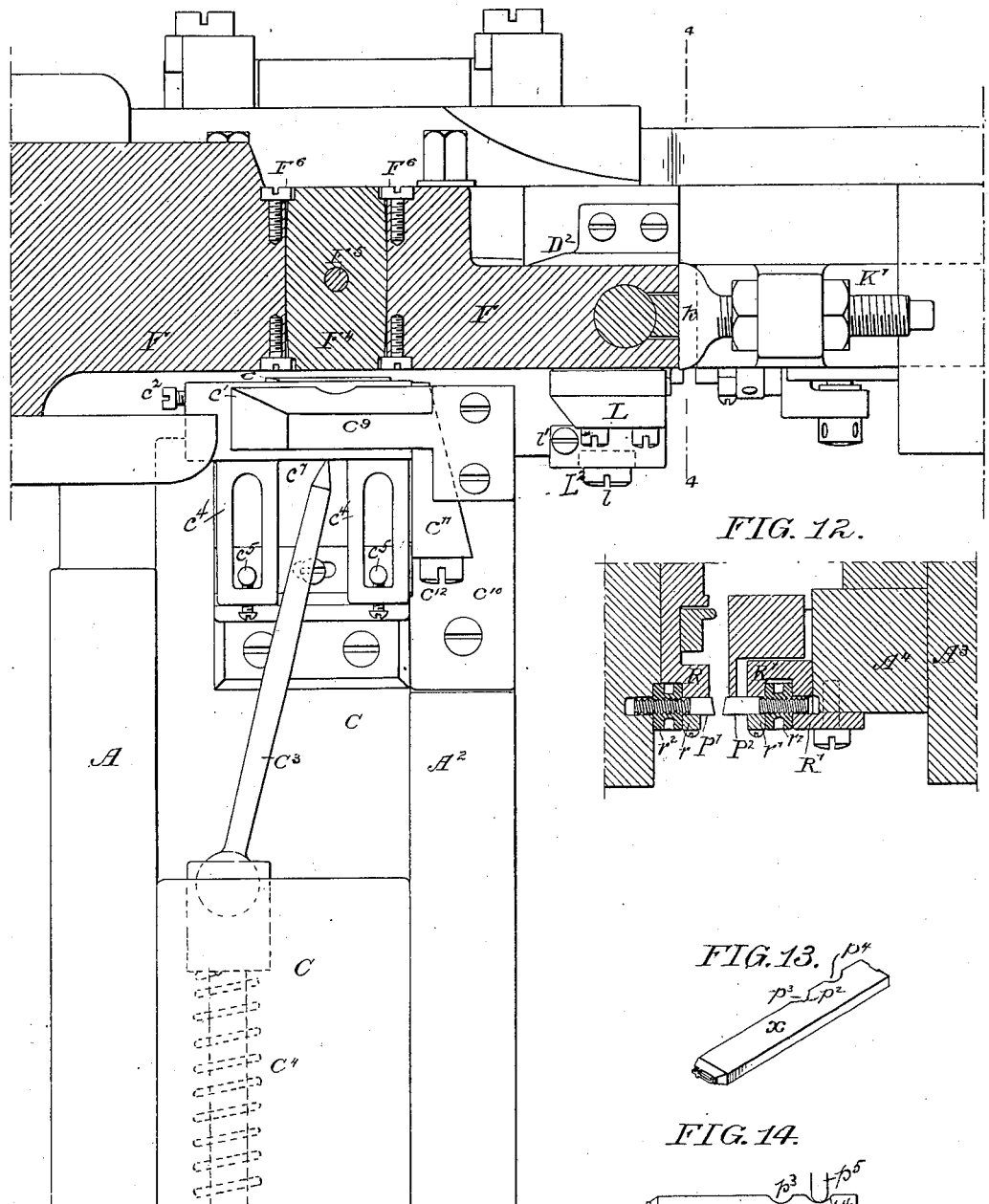
Figure 9:
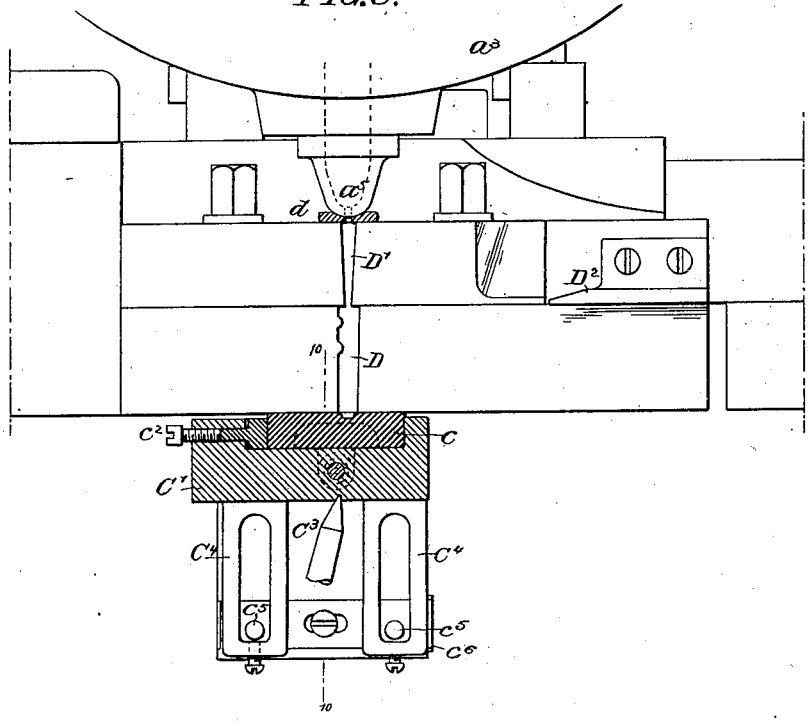
Figure 10:
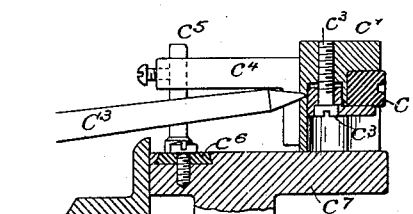
Figure 11:
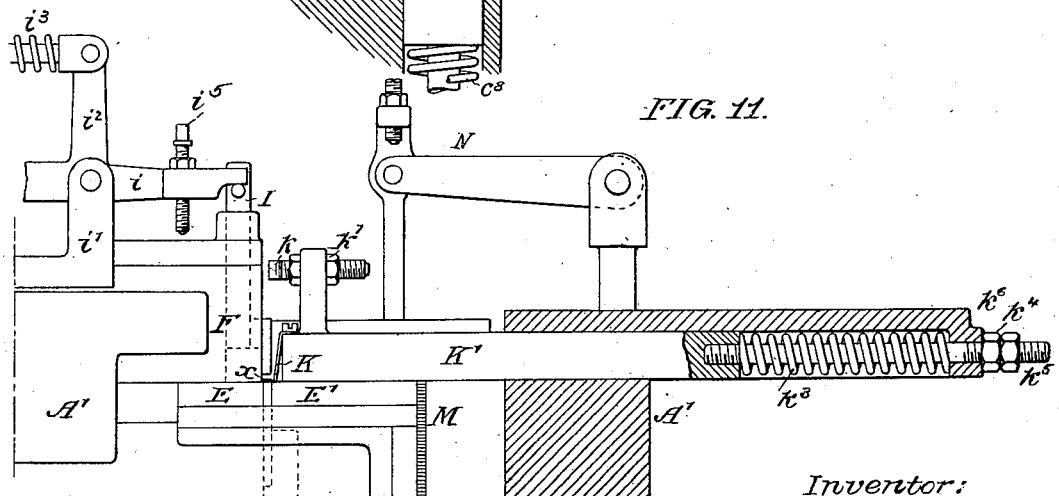

Figure 1 is a front elevation of my improved type-casting machine. Fig. 2 is a transverse section on the line 2 2, Fig. 1. Fig. 3 is a plan view of a portion of the machine, showing the upper slide in section. Fig. 4 is a transverse section on the line 4 4, Fig. 3. Fig. 5 is a face view of the mold and the grooving and dressing apparatus with matrix removed and showing the slide partly in section. Fig. 6 is a rear view of the mold. Fig. 7 is a sectional plan view on the line 7 7, Fig. 5. Fig. 8 is a sectional view on the line 8 8, Fig. 7. Fig. 9 is a plan view of the mold with the upper slide removed and showing the matrix in section. Fig. 10 is a transverse section through the matrix on the line 10 10, Fig. 9. Fig. 11 is a face view showing the slides in position to receive the type from the mold. Fig. 12 is a sectional view of the cutters on the line 12 12, Fig. 5. Figs. 13 and 14 are views of one of the types. Fig. 15 is a perspective view of the lower cutter, Figs. 4 and 5. Fig. 16 is a perspective view of the cutter for grooving the base of the type.

Referring to Fig. 1, A represents the frame of the machine, having bearings $a$ for the shaft B, on which is a belt-pulley $b$, coupled to the shaft by the clutch $b'$. Supported by the frame A is a casting A', having a portion A$^2$, Fig. 2, on which is mounted the slide C, carrying the matrix $c$. Said matrix is clamped in the box $c'$, Fig. 9, by the screws $c^2$ $c^3$. The screw $c^2$ clamps the matrix laterally, and the screw $c^3$ passes through a plate and into the box. The plate bears against the under side of the matrix, as shown clearly in Fig. 10.

Secured to the box $c'$ are two slotted arms $c^4$. Pins $c^5$ on a transversely-adjustable plate $c^6$ extend into the slots in the arms. The plate $c^6$ is adapted to undercut ways in the block $c^7$ and is held in the adjusted position by suitable clamp-screws. This block has a stem which has its bearing in the slide C, as clearly shown in Fig. 2. A spring $c^8$ on this stem holds the matrix-box $c'$ up tight against a plate $c^9$, which is secured to a bracket $c^{10}$ on the casting A$^2$, Figs. 3 and 4.

A rod C$^3$ (shown in Fig. 3) is acted upon by a spring C$^4$ and holds the matrix-box against the pins $c^5$. The slots in the arms $c^4$ allow the matrix-box to slide back from the pins $c^5$ when it strikes the mold.

The matrix can be adjusted laterally by the wedge $c^{11}$, which is controlled by the screw $c^{12}$, Figs. 3 and 4.

Pivoted to the frame A at $a^2$ is the furnace $a^3$, in which the metal is heated by gas or other means. The metal-kettle $a^4$ is provided with a nipple $a^5$, through which the molten metal is discharged into the mold D by means of a pump operated by a lever $a^6$, which is connected to a rod $a^7$, acted upon by a cam $a^9$, mounted on the driving-shaft B, Fig. 1. By pivoting the furnace, as shown, it can be swung out from the mold, so that access may be had to the different parts of the machine for cleansing or for repairs.

On the casting A', Fig. 5, are mounted the plates forming the mold D. The plates E E' form the sides of the mold and rest on the plate E$^2$. Said plate can be adjusted by the wedges $e$, which extend from the rear of the machine. These wedges are provided with adjusting-screws $e'$. (Clearly shown in Figs. 4 and 6.) The slide F, Figs. 5 and 6, forms the upper side of the mold D, and the body-piece G forms the under side. This body-piece is secured to the slide $g$, which extends downwardly through the casting A', Fig. 2, and rests on the adjustable lever $g'$, pivoted at $g^2$. This lever is made in two parts. One part is made adjustable in respect to the other. The lower portion of the lever is supported by a roller $g^3$ on a bell-crank lever $g^4$, which is pivoted to the frame of the machine at $g^5$. Said bell-crank lever is acted upon by the cam $b^3$ on the driving-shaft B and elevates the slide at the proper time. The slide F is guided in the upper portion of the casting A' and receives its motion from the cam $f$, Fig. 1, mounted on the driving-shaft B. This cam acts upon a lever $f'$, which is pivoted to the frame at $f^2$ and is connected by the rod $f^3$ to the lever F', which is pivoted at $F^2$ in a sliding block $F^3$. This block can move vertically in a bracket secured to the frame of the machine. Attached to the block is a spring $F^7$, which tends to hold the slide F down on the mold, as shown in Fig. 1.

By the constant striking of the matrix the slide F in time is worn so that it will not be parallel with the surface of the matrix. To obviate this, the slide F is provided with a block $F^4$. (Shown in Figs. 3 and 5.) This block is pivoted on a screw $F^5$ and is adjusted by means of a screw $F^6$ at each corner, so that its end will be parallel with the matrix. The screws in the present instance are adapted to threads cut in the slide, and their heads rest on the block, so that by a slight adjustment of the screws the block can be moved into proper position and locked. The opening in the slide F for the screw $F^5$ is larger than the screw, so that the block can be adjusted bodily, if necessary.

I will now describe the operation of the machine and the mechanism for marking, trimming, and finishing the molded type.

The molten metal is forced from the melting-pot into the mold D through the apron $d$, which makes a tight joint between the nipple $a^5$ and the mold, Fig. 9. The matrix C forms the letter on the face of the type and is then withdrawn from the mold by the lever H, Fig. 2, which is acted upon by the cam $h$. Said lever is provided with a friction-roller $h'$ at its lower end, and its upper end is bifurcated to engage with a pin on the slide C, carrying the matrix. The slide F is withdrawn from above the mold by the lever F' to the position shown in Fig. 11. The body-piece G then forces the type $x$ out of the mold. As the slide F returns it moves the type in front of it along the upper surface of the plate E'. The type is held to the front of the slide F by a spring K, secured to the slide K', Fig. 11. The slide K' is moved forward by a spring $k^3$, and adapted to a projection on the slide is a stop $k$, which can be adjusted by the nuts $k'$. This stop relieves the type of the pressure of the heavy spring $k^3$. This spring tends to keep the slide K' against the slide F during the entire motion except when the slide F is drawn back from the mold to allow the body-piece to discharge the type. The slide K' is then held from the slide F by the stop $k^4$, in the form of a nut on the rod $k^5$. This stop strikes a projection $k^6$ on the machine. A plunger-die I, having the manufacturer's trade-mark thereon, is carried by the slide F and is acted upon by the lever $i$, Figs. 1 and 11, which is pivoted at $i'$ to a bearing carried by the slide F. Said lever has an arm $i^2$, acted upon by a spring $i^3$, resting against the standard $f^4$, also carried by the slide F. The lever $i$ is held in the raised position by a roller or projection J, mounted in a fixed position on the casting A', and when the lever is withdrawn from under the roller by the slide F moving forward the plunger I is forced down by the spring, impressing the trade-mark or other symbol in the type-body. The movement of the lever is slight and is limited by a set-screw $i^5$, and the end of the lever is so shaped that it will pass under the roller J on its return. The type then passes the cutters L L', Figs. 5 and 15, which dress the upper and lower edges of the type, removing the burs left by the matrix. At the same time the knife $D^2$ cuts off the jet from the base of the type which is formed by the portion D' of the mold. The cutters L L' are adjustable toward and from each other. The cutter L is secured to a bracket $L^2$, clamped to the frame by a binding-screw $l$, and can be adjusted vertically by a set-screw $l'$ for different thicknesses of type. The lower cutter L has a tapered base $l^5$, adapted to an inclined seat $l^3$ on the frame, and is held in place by a clamp-screw $l^4$. This cutter can be adjusted to take up for wear. When the type reaches the channel M, the plunger is acted upon by the screw N, carried by the arm $n$ on the rod $n'$. This rod extends downwardly into position to be acted upon by the cam $n^2$, mounted on the driving-shaft B. The upper portion of the rod is held in position by a link N', pivoted to the bearing $N^2$. Each type is forced into the channel M, and a groove is cut in the base of the type by the cutter Q, having a series of teeth. (More clearly shown in Figs. 7, 8, and 16.) This cutter is secured to the plate Q', which is held on the block $Q^2$ by the screw $Q^3$ and is adjusted by the screw $Q^4$, which regulates the depth of the cut. The block $Q^2$ is held in the frame $A^3$, in which is mounted the adjusting-screw $Q^5$, by which the cutter Q can be laterally adjusted. After the type pass the cutter Q they are acted upon by the cutter P. (Shown in Fig. 4.) Said cutter is mounted on the plate $p$, which is secured by the set-screw $p'$. A slot in the plate $p$ allows for the adjustment of the cutter. This cutter makes an extra cut $p^2$ in the bottom of the nick $p^3$, which is formed in the edge of the type by the mold, Fig. 13. A rib $p^5$ forms a guide for the type as they pass through the channel and is secured by screws $p^6$ and may be adjusted by a screw $p^7$. The rib $p^5$ rests in the nick $p^4$ in the type, but, as shown in Fig. 14, is made narrower than the nick, so that it will not bur the type when the cutters are acting. As the type pass down the channel they are dressed on either side at the face-corner not heretofore dressed by the cutters P' P². The cutters P' (shown in Figs. 5 and 12) are held by the strip $r$, which is attached to lugs cast on the plate R by screws. The cutters P² on the opposite side of the frame are held by a strip $r'$, which is secured to a separate casting R', attached to the plate A⁴. The cutters P P' have squared heads and screw-threaded shanks on which are nuts $r^2$ for adjusting the cutters in respect to the type. The squared heads prevent the cutters from turning. It will be seen that by turning the nuts on the shanks a very accurate adjustment may be obtained. After passing the last set of knives the type is finished and is forced down and around the curved portion of the channel and out onto a strip M', which is used to remove the type from the machine.

I claim as my invention—

1. The combination in a type-casting machine, of the mold, the matrix, a box therefor having slotted arms, pins extending into the slots of the arms, a spring-bar adapted to force the matrix against the mold, substantially as described.

2. The combination of the mold, the slide C, a block mounted in said slide, a box resting on the block, a matrix carried thereby, slotted arms on the box, a plate $c^6$ carried by the block, pins on said plate adapted to the slots in the arms, said plate being laterally adjustable, substantially as described.

3. The combination in a type-casting machine having a mold and a channel for the type, a reciprocating slide F forming one side of the mold, a slide K' in front of the slide F, a spring K carried by the slide K' and adapted to confine the cast type in front of the slide F so that the type will be rigidly held until it reaches the channel and an adjustable stop $k$ on the slide K' bearing against the slide F, substantially as described.

4. The combination of the mold for the type having projections forming a nick in the side of the type, a channel through which the type passes after leaving the mold, a nick-guide in said channel narrower than the nick formed in the type so that it will bear only against the base of the nick thereby preventing the burring of the type at the nick, substantially as described.

5. The combination of the plates forming the mold, the slide F, a body-piece, a matrix, a block pivoted in the slide F, and screws for shifting the block on the pivot so that the edge of the block will be kept parallel with the matrix, substantially as described.

6. The combination of the plates forming the mold, a slide, a body-piece, a matrix, a block mounted on said slide, screws bearing against each corner of the block and adapted to the slide so as to adjust the block to make its face coincide with the matrix, substantially as described.

7. The combination of plates forming a mold, a channel for the type, a body-piece, a reciprocating slide, a series of cutters L L' which dress the upper and lower edges of the type as it is held in front of the slide and while it passes to the channel, a bracket carrying the cutter L, said bracket adapted to ways in the frame, a set-screw for vertically adjusting the bracket, a binding-screw adapted to a slot in the bracket, the lower cutter L' having a tapered base, an inclined seat on the frame on which the cutter rests, and a clamp-screw for holding the cutter in the adjusted position.

In testimony whereof I have signed my name to this specification in the presence of two subscribing witnesses.

GEORGE H. ZIEGLER.

Witnesses:
 WILL. A. BARR,
 JOS. H. KLEIN.